United States Patent [19]

Rosenwinkel et al.

[11] 4,283,127
[45] Aug. 11, 1981

[54] NOVELTY EYEGLASSES

[75] Inventors: Donald A. Rosenwinkel, Tinley Park; Harry Disko, S. Barrington, both of Ill.

[73] Assignee: Marvin Glass & Associates, Chicago, Ill.

[21] Appl. No.: 98,551

[22] Filed: Nov. 29, 1979

[51] Int. Cl.$^3$ .............................................. G02C 3/00
[52] U.S. Cl. ........................................ 351/158; 2/426; 40/402
[58] Field of Search ................. 351/158, 122; 40/402, 40/363, 464, 546, 559, 514, 153, 130; 46/1 R; 2/426, 454; D21/240; 250/199; 350/336, 330, 347; 240/6.43

[56] References Cited

U.S. PATENT DOCUMENTS

| 3,119,903 | 1/1964 | Rosemond et al. | 351/158 |
| 3,418,737 | 12/1968 | Lambert | 351/158 |
| 3,923,044 | 12/1975 | Miller | 351/158 |
| 4,032,777 | 6/1979 | McCaleb | 250/221 |

FOREIGN PATENT DOCUMENTS

| 1467982 | 3/1977 | United Kingdom | 351/158 |
| 2008271 | 5/1979 | United Kingdom | 351/158 |

Primary Examiner—John K. Corbin
Assistant Examiner—B. W. de los Reyes
Attorney, Agent, or Firm—Mason, Kolehmainen, Rathburn & Wyss

[57] ABSTRACT

A pair of novelty eyeglasses includes a frame for supporting them on the wearer's head and a pair of transparent lenses. The frame includes a pair of support earpieces connected by hinges to the frames. Two light emitting diodes or LEDs are secured to the frame, one adjacent each lense and connected to a portable source of power, such as small batteries, mounted in one of the earpieces. A hinge switch, defined at one of the hinges connecting one of the earpieces to the frame, must be closed by moving the respective earpiece to the open position before the LEDs can be actuated. A manually actuatable switch is secured to the frame in series with the batteries and the light emitting diodes. The manually actuatable switch can be selectively closed by the user to energize the LEDs thereby creating a novel effect.

14 Claims, 5 Drawing Figures

U.S. Patent  Aug. 11, 1981  4,283,127
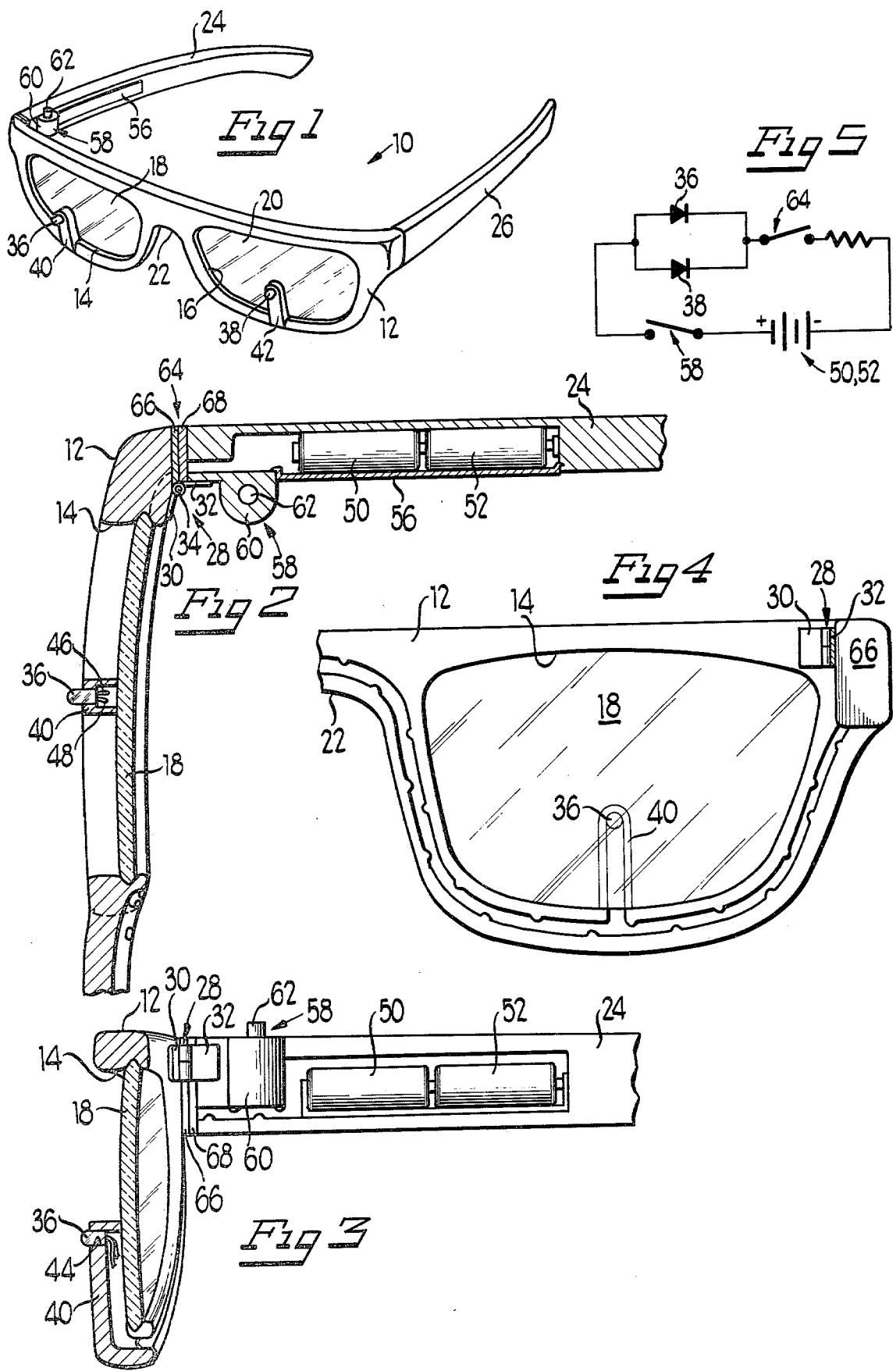

NOVELTY EYEGLASSES

BACKGROUND OF THE INVENTION

1. Field of the Invention

The present invention relates to novelty devices and in particular to new and improved pairs of novelty eyeglasses.

2. Brief Description of the Prior Art

Both adults and children enjoy novelty items that are attention getting and entertaining. Such novelty items typically are used at parties and as entertaining jokes on a casual basis. Prior art novelty items include items such as a pair of eyeglasses having a large fake nose and mustache attached thereto. Such novelty devices provide hours of entertainment both for the user and the observer. It is also desirable for such novelty items to be used in different environments such as in the dark to provide both a novel and an eerie effect.

SUMMARY OF THE INVENTION

An object of the present invention is to provide a new and improved pair of novelty eyeglasses.

A further object of the present invention is to provide a new and improved pair of novelty eyeglasses that include light emitting devices providing an entertaining and eerie effect.

Another object of the present invention is to provide a new and improved pair of novelty eyeglasses that may be worn by the user and operated to emit light therefrom either continuously or intermittently to provide a flashing effect.

The present invention is directed to a new and improved pair of novelty eyeglasses including a frame within which a pair of lenses are mounted. First and second earpieces are pivotally connected by hinges to the frame. Two light emitting elements such as light emitting diodes are mounted on the frame adjacent to the lenses and are electrically connected to a source of electrical energy such as a pair of batteries mounted in one of the eyepieces. A manually actuated switch is also included that may be manually actuated by the wearer of the glasses of the present invention to control the energization of the light emitting diodes to be either constantly energized or intermittently energized to provide a flashing effect.

BRIEF DESCRIPTION OF THE DRAWINGS

The above and other objects and advantages and novel features of the present invention will become apparent from the following detailed description of the preferred embodiment of the invention illustrated in the accompanying drawing wherein:

FIG. 1 is a perspective view of a pair of novelty eyeglasses constructed in accordance with the principles of the present invention;

FIG. 2 is an enlarged fragmentary horizontal cross-sectional view of a portion of the eyeglasses of the present invention;

FIG. 3 is a fragmentary vertical cross-sectional view of a portion of the eyeglasses of the present invention;

FIG. 4 is a front view of one lense and surrounding frame of the eyeglasses of the present invention; and FIG. 5 is a schematic illustration of the electrical circuit employed in the eyeglasses of the present invention.

DESCRIPTION OF THE PREFERRED EMBODIMENT

Referring now to the drawing and initially to FIG. 1, there is illustrated a pair of novelty eyeglasses generally designated by the reference numeral 10. The novelty eyeglasses 10 are intended to be worn by an individual preferably in a dark or subdued light situation to create an errie effect by continuously or intermittent emission of light around the eyes.

The novelty eyeglasses 10 include a frame 12 similar in appearance to the typical frames employed in ordinary eyeglasses. The frame 12 includes first and second apertures 14 and 16 for mounting first and second lenses 18 and 20. The lenses 18 and 20 preferably are nonprescription and may be either plastic or glass; however, plastic is preferred in view of its resistance to shattering or cracking.

The frames 12 include an undulating portion 22 as is found in ordinary frames so as to fit onto the bridge of a nose. Hingedly mounted to the frame 12 are first and second earpieces 24 and 26 that are intended to fit over the ears of the wearer to hold the eyeglasses 10 onto the wearer's face. The earpieces 24 and 26 are elongated and slightly thickened and are connected to the frame 12 by hinges generally designated by the reference numeral 28. The hinges 28 include first and second plates 30 and 32 joined together by a pin 34 allowing the earpieces 24 and 26 to be folded crossed in back of the frame 12 or to be extended outwardly and parallel to each other to be placed over the ears of the user thereby providing a desired holding function. The eyeglasses 10 include first and second light emitting devices 36 and 38 that in the preferred embodiment are light emitting diodes or LEDs to provide an eerie and entertaining light effect to the eyeglasses 10. As is understood by one skilled in the art, light emitting diodes of the type employed in the eyeglasses 10 may be made of a variety of different materials to produce several different colors. For example, one preferred color is red. The light emitting diode 36 and 38 are secured within support frames or holding members 40 and 42 that are integrally fabricated on the frame 12 and include apertures 44 (FIG. 3) within which the diodes 36 and 38 are mounted. The holding members 40 and 42 extend upwardly from the portion of the frame 12 mounting the bottom of each lense 18 and 20 to a point wherein the diodes 36 and 38 are positioned slightly below the center of each lense 18 and 20. This positioning of the diodes 36 and 38 allows the eyeglasses 10 when observed from a distance to appear as through the light emitting from the diodes 36 and 38 is emitted from the cornea of the eyes of the wearer.

The light emitting diodes 36 and 38 are electrically connected in parallel by electrical wires 46 and 48 connected to a pair of batteries 50 and 52 mounted within a recess 54 fabricated in the earpiece 24 and covered by a plate 56. The wires 46 and 48 may be included in the frame 12 or merely glued thereto. The wires 46 and 48 are connected to the batteries 50 and 52 through a first manually actuatable switch 58 that is defined in a switch housing 60 integrally fabricated on the earpiece 24. The switch 58 includes a plunger or pushbutton 62 that may be manually depressed by the finger of the user of the glasses 10 to complete the electrical circuit to energize the light emitting diodes 36 and 38.

As can be understood, the plunger or button 62 may be depressed to energize the light emitting diodes 36 and 38 continuously or may be repeatedly depressed and released creating a flashing effect. To complete the electrical circuit and to prevent inadvertent use of power, a second switch generally designated by the reference numeral 64 is also provided. The switch 64 includes first and second metal or electrical conductive plates 66 and 68. The switch 64 is located at the hinge 28 connecting the earpiece 24 to the frame 12. The plate 66 is secured to the frame 12 and the plate 68 is secured to the end of the earpiece 24 adjacent to the frame 12. As the earpiece 24 is folded toward the frame 12, the plates 66 and 68 are moved out of engagement thus preventing the flow of current therethrough. As can be understood, depression of the pushbutton or plunger 62 in this position of the earpiece 24 will not result in the energization of the light emitting diodes 36 and 38. Consequently, the earpiece 24 must be fully extended to engage plates 66 and 68 before the circuit may be completed and energization of the light emitting diodes 36 and 38 can be accomplished by depression of the plunger or pushbutton 62.

The electrical circuit of the eyeglasses 10 is best illustrated in FIG. 5. As can be understood from the above description, the novelty eyeglasses 10 may provide a novel and entertaining effect in a darkened room or area by opening the earpieces 24 and 26 to their fully extended positions whereupon the plates 66 and 68 engage each other, placing the eyeglasses on the face of the user, and creating an eerie red or similarly colored light upon actuation of the switch 60 in the manner previously described.

Many modifications and variations of the present invention are possible in light of the above teachings. Thus, it is to be understood that, within the scope of the appended claims, the invention may be practiced other than specifically described above.

What is claimed and desired to be secured by Letters Patent in the United States:

1. A pair of eyeglasses comprising:
   a frame;
   a pair of lens apertures in said frame;
   a pair of earpieces secured to said frame; and
   means for emitting light mounted on said frame, said light emitting means including an extension of said frame extending into said lens apertures and a light emitting device in each said extension at a location relative to each of said lens apertures to simulate light being emitted from approximately the cornea of the eyes of the user of said eyeglasses.

2. The eyeglasses set forth in claim 1 further comprising a selectively operable switch means for coupling a source of energy to said light emitting means.

3. The eyeglasses set forth in claim 1 further comprising a pair of hinges connecting said first and second earpieces to said frame.

4. The eyeglasses set forth in claim 3 further comprising an interrupter switch means defined by one of said hinges for coupling said light emitting means with a source of energy.

5. The eyeglasses set forth in claim 1 wherein each said light emitting device comprises a light emitting diode.

6. Novelty eyeglasses, comprising:
   a frame;
   first and second lenses mounted in said frame;
   light emitting means for emitting light;
   first and second earpieces secured to said frame;
   first manually actuatable switch means for energizing said light emitting means; and
   second switch means for energizing said light emitting means, said second switch means comprises a first switchblade secured to said frame and a second switchblade secured to one of said first and second earpieces for contact when the earpiece is in its open position.

7. The eyeglasses claimed in claim 6 wherein said light emitting means comprises first and second light emitting diodes mounted adjacent said first and second lenses.

8. The eyeglasses claimed in claim 7 wherein said first and second diodes emit colored light.

9. The eyeglasses claimed in claim 6 wherein one of said first and second earpieces includes energy means for energizing said light emitting means.

10. A novelty device, comprising:
    a frame;
    a pair of lenses mounted in said frame;
    a pair of light emitting elements mounted on said frame adjacent said lenses; so as to simulate light being emitted from approximately the cornea of the eyes of the user of said eye glasses
    a pair of ear members mounted on said frame;
    a first manually actuatable switch mounted on said eyeglasses electrically connected to said light emitting elements; and
    a second switch including a first plate electrically connected to said light emitting elements and a second plate electrically connected to a source of electricity.

11. The eyeglasses set forth in claim 10 further comprising hinge means for connecting said ear members to said frame.

12. The eyeglasses set forth in claim 10 wherein said first plate of said second switch is mounted on said frame and said second plate of said second switch is mounted on one of said ear members.

13. The eyeglasses set forth in claim 10 wherein said light emitting elements comprises light emitting diodes.

14. The eyeglasses set forth in claim 10 wherein one of said ear members includes means for carrying a source of electrical energy.

* * * * *